US 9,567,970 B2

(12) United States Patent
Wood

(10) Patent No.: US 9,567,970 B2
(45) Date of Patent: *Feb. 14, 2017

(54) WIND TURBINES AUGMENTED WITH ROTATING DIFFUSERS

(75) Inventor: Ben David Wood, Oxford (GB)

(73) Assignee: Anakata Wind Power Resources s.a.r.l., Corcelles (CH)

( * ) Notice: Subject to any disclaimer, the term of this patent is extended or adjusted under 35 U.S.C. 154(b) by 776 days.

This patent is subject to a terminal disclaimer.

(21) Appl. No.: 14/112,710

(22) PCT Filed: Apr. 20, 2012

(86) PCT No.: PCT/GB2012/050885
§ 371 (c)(1),
(2), (4) Date: Oct. 18, 2013

(87) PCT Pub. No.: WO2012/143734
PCT Pub. Date: Oct. 26, 2012

(65) Prior Publication Data
US 2014/0044535 A1 Feb. 13, 2014

(30) Foreign Application Priority Data
Apr. 21, 2011 (GB) .................. 1106823.6

(51) Int. Cl.
*F03D 1/04* (2006.01)
*F03D 1/02* (2006.01)
*F03D 1/06* (2006.01)

(52) U.S. Cl.
CPC .................. *F03D 1/04* (2013.01); *F03D 1/025* (2013.01); *F03D 1/0625* (2013.01);
(Continued)

(58) Field of Classification Search
CPC .......... F03D 1/04; F03D 1/025; F03D 1/0625;
F03D 1/0608; F05B 2240/122; F05B 2240/124; F05B 2240/132; F05B 2240/133; F05B 2240/2211; F05B 2240/311; F05B 2240/33; F05B 2240/40; F05B 2240/92; F05B 2240/93; F05B 2240/95; F05B 2280/5001; F05B 2210/30; F05B 2240/32; F05B 2240/91; Y02E 10/721; Y02E 10/728
(Continued)

(56) References Cited

U.S. PATENT DOCUMENTS

| 4,075,500 A | 2/1978 | Oman et al. |
| 4,720,640 A | 1/1988 | Anderson et al. |

(Continued)

FOREIGN PATENT DOCUMENTS

| DE | 804090 C | 4/1951 |
| FR | 1007883 A | 5/1952 |

(Continued)

OTHER PUBLICATIONS

International Search Report for International Application No. PCT/GB2012/050885 mailed Jul. 2, 2012.
(Continued)

*Primary Examiner* — Ninh H Nguyen
*Assistant Examiner* — Aaron R Eastman
(74) *Attorney, Agent, or Firm* — Merchant & Gould P.C.

(57) ABSTRACT

Diffuser-augmented wind turbines can include a first diffuser ring arranged to form a turbine rotor cowling, the diffuser being fixed to and rotatable with the turbine rotor about the horizontal axis of the wind turbine. The first diffuser ring may have one or more dynamic, aero-elastic, vortex entrainment devices attached to a trailing edge of the diffuser. The first diffuser ring may include one or more slot gaps arranged within its body, each slot gap creating a channel between the interior and exterior surfaces of the first diffuser ring. In
(Continued)

some embodiments the diffuser may optionally further include one or more further diffuser rings, the one or more further diffuser rings being static rings (e.g. non-rotatable about the horizontal axis) or dynamic diffuser rings (e.g. rotatable around the horizontal axis).

35 Claims, 10 Drawing Sheets

(52) U.S. Cl.
CPC ..... *F05B 2210/30* (2013.01); *F05B 2240/122* (2013.01); *F05B 2240/124* (2013.01); *F05B 2240/132* (2013.01); *F05B 2240/133* (2013.01); *F05B 2240/311* (2013.01); *F05B 2240/33* (2013.01); *F05B 2240/40* (2013.01); *F05B 2240/92* (2013.01); *F05B 2240/93* (2013.01); *F05B 2240/95* (2013.01); *F05B 2280/5001* (2013.01); *Y02B 10/30* (2013.01); *Y02E 10/721* (2013.01)

(58) Field of Classification Search
USPC ........................................... 415/4.5
See application file for complete search history.

(56) References Cited

U.S. PATENT DOCUMENTS

| | | | |
|---|---|---|---|
| 7,220,096 | B2* | 5/2007 | Tocher ................ F03D 1/04 290/55 |
| 2005/0002783 | A1 | 1/2005 | Hiel |

FOREIGN PATENT DOCUMENTS

| | | |
|---|---|---|
| RU | 2136958 C1 | 9/1999 |
| WO | 2004083631 A2 | 9/2004 |
| WO | 2008/043367 A1 | 4/2008 |
| WO | 2009/076479 A1 | 6/2009 |
| WO | 2010036678 A1 | 4/2010 |
| WO | 2010131052 A2 | 11/2010 |

OTHER PUBLICATIONS

Communication Regarding Non-English References DE 804 090 and FR 1 007 883.

* cited by examiner

WIND TURBINES AUGMENTED WITH ROTATING DIFFUSERS

This application is a National Stage Application of PCT/GB2012/050885, filed 20 Apr. 2012, which claims benefit of Serial No. 1106823.6, filed 21 Apr. 2011 in Great Britain and which applications are incorporated herein by reference. To the extent appropriate, a claim of priority is made to each of the above disclosed applications.

TECHNICAL FIELD

This description relates to wind turbines that are augmented with rotatable diffusers or ducting arrangements to accelerate airflow to the rotor plane.

BACKGROUND

The listing or discussion of an apparently prior-published document in this specification should not necessarily be taken as an acknowledgement that the document is part of the state of the art or is common general knowledge.

A wind turbine is a device that can be used to convert kinetic energy (from the wind) into mechanical energy, for example by using wind to rotate turbine rotor blades. An example of a classic wind turbine is a horizontal axis wind turbine comprising an electrical generator in a horizontal central hub with turbine rotor blades attached. The turbine rotor delivers torque energy to the generator hub which converts this to electrical energy via an electrical generator. However, a classical wind turbine that is not augmented with a diffuser is limited in the amount of energy it can convert from wind by Betz' law, which states that for a classical wind turbine, in which the airflow is axial and free streaming, no more than 59.3% of kinetic energy from wind can be converted to mechanical energy.

Wind turbine diffusers may be used to increase the velocity of the air entering the turbine's rotor plane, thus increasing the power output and efficiency of any given turbine. Conventional diffusers require a large expansion in exit area of the wind turbine in order to induce a relatively modest increase in wind speed (and hence, power output and efficiency). This increased exit area reduces the air pressure behind the turbine and leads to air being accelerated over the turbine rotor blades. However, expanding the exit area of the wind turbine generally results in the use of large, uneconomic and highly drag-loaded cowlings around the turbine. US 2005/0002783 A1 describes a diffuser augmented wind-turbine which has an expanded exit area.

Another example of a conventional wind turbine diffuser is one that uses a mixer-ejector system to draw high energy air into the rear section of the diffuser. In theory, this system decreases the air pressure behind the wind turbine and therefore draws more air through the turbine rotor plane, which increases the power output and efficiency. However, injection-mixer systems may not provide as significant an increase in the velocity of the air passing through the turbine in practice and therefore may not provide a significant increase in power output efficiency. WO 2010/036678 A1 describes a mixer-ejector (MEWT) wind turbine.

Wind turbine rotor cowlings that are attached to and rotate with the turbine rotor blade tips may be used to reduce the noise and disruption caused by blade tip vortices. However, they are not designed to reduce the pressure behind the turbine plane and therefore accelerate the air through the turbine plane thereby increasing power output and efficiency. WO 2004/083631 A2 describes a wind turbine with a rotatable cowling which is designed to eliminate blade tip vortices. WO 2010/131052 describes a static wind turbine cowling which has angled slots in front of the turbine plane which induce rotational flow acting against the post-rotor wake. This acts like an anti-swirl device, re-aligning the flow.

SUMMARY

Diffuser-augmented wind turbines are described. In an embodiment a wind turbine diffuser comprises a first diffuser ring arranged to form a turbine rotor cowling, the diffuser being fixed to and rotatable with the turbine rotor about the horizontal axis of the wind turbine. The first diffuser ring comprises one or more vortex entrainment devices arranged on the trailing edge of the diffuser ring. The first diffuser ring may comprise one or more slot gaps arranged within its body, each slot gap creating a channel between the interior and exterior surfaces of the first diffuser ring. In some embodiments the diffuser may optionally further comprise one or more further diffuser rings, the one or more further diffuser rings being static rings (e.g. non-rotatable about the horizontal axis) or dynamic diffuser rings (e.g. rotatable around the horizontal axis).

A slot gap creates a progressively decreasing overall duct cross-sectional area in the axial direction, which enables the injection of higher speed air tangentially or substantially tangential to the internal or lower surface of a diffuser ring by channelling high pressure air (relative to the air pressure within or downstream from the diffuser) from the external or upper surface of the diffuser ring through the slot gap to the internal or lower surface of the diffuser ring. This re-energises the boundary layer and delays the onset of boundary layer growth and eventual separation from the diffuser wall.

The diffuser may comprise a first diffuser ring comprising an inlet and an outlet; and one or more slot gaps arranged within its body, each slot gap creating a channel between the interior and exterior surfaces of the first diffuser ring, wherein the first diffuser ring is adapted to form a turbine rotor cowling that is integrally attachable to a turbine rotor to form a unit that is rotatable about the horizontal axis of the wind turbine.

In one aspect there is provided a horizontal axis wind turbine augmented with a diffuser, the diffuser comprising, a first diffuser ring comprising, an inlet and an outlet, and one or more vortex entrainment devices attached to a trailing edge of the first diffuser ring, wherein the first diffuser ring is adapted to form a turbine rotor cowling that is integrally attachable to a turbine rotor to form a unit that is rotatable about the horizontal axis of the wind turbine.

In an embodiment one or more slot gaps may arranged within the body of the first diffuser ring, each slot gap creating a channel between the interior and exterior surfaces of the first diffuser ring, In one aspect, there is provided a horizontal axis wind turbine that is augmented with a diffuser, the diffuser comprising a first diffuser ring comprising: an inlet and an outlet; and one or more slot gaps arranged within its body, each slot gap creating a channel between the interior and exterior surfaces of the first diffuser ring, wherein the first diffuser ring is adapted to form a turbine rotor cowling that is integrally attachable to a turbine rotor to form a unit that is rotatable about the horizontal axis of the wind turbine. Optionally, the one or more slot gaps may have a progressively decreasing overall duct cross-sectional area in the axial direction, arranged so that air is accelerated from the interior surface of the diffuser into the interior.

In another aspect there is provided a horizontal axis wind turbine augmented with a diffuser, the diffuser comprising: a first diffuser ring and one or more static diffuser rings, the first diffuser ring being adapted to form a turbine rotor cowling that is integrally attachable to a turbine rotor to form a unit that is rotatable about the horizontal axis of the wind turbine and wherein each pair of diffuser rings are separated from each other by a wholly circumferential slot gap.

In an embodiment one or more vortex entrainment devices may be attached to a trailing edge of the diffuser. The vortex entrainment devices may be dynamic, aero elastic vortex entrainment devices.

In an embodiment, the diffuser may further comprise one or more additional diffuser rings, each diffuser ring having an inlet and an outlet, arranged substantially co-axially to the first diffuser ring. For example, the diffuser may comprise the first diffuser ring and a static diffuser ring that is downstream from the first diffuser ring or the diffuser may comprise the first diffuser ring and a static diffuser ring upstream from the first diffuser ring. Alternatively, the diffuser may comprise the first diffuser ring and two static diffuser rings, one being upstream and the other downstream of the first diffuser ring. The inlet area of each of the diffuser rings may be less than the outlet area of the diffuser ring immediately upstream from it and the outlet area may be greater than or equal to its inlet area, wherein the total outlet area of the static diffuser rings downstream of the first diffuser ring is greater than the largest cross-sectional area of the rings.

In an embodiment the wind turbine may further comprise one or more vent structures and one or more suction slots, where the one or more vent structures are located on the exterior surface of diffuser ring and the or each vent structure is connected to one or more suction slots, the suction slots extending through the entire thickness of the diffuser ring. The vent structures may only by located on the exterior surface of static diffuser rings.

The ratio of the total diffuser outlet area to the first diffuser ring inlet area may be greater than the ratio of the largest diffuser cross-sectional area to the first diffuser ring inlet area.

In an embodiment the wind turbine may further comprise a central shaft.

In an embodiment the wind turbine may further comprise radially oriented guide vanes connected to at least one static diffuser ring and/or the central shaft. The guide vanes may be arranged to reduce twist in airflow passing through the diffuser and are comprised of at least one of: pre-rotation vanes, located upstream of the turbine plane; and/or post-rotation vanes, located downstream of the turbine plane.

The diffuser may further incorporate one or more vortex generators.

In a downstream direction from the primary diffuser ring, each of the one or more further diffuser rings may have a lower camber than the immediately previous diffuser ring. The diffuser may further comprise one or more additional partial slot gaps which extend from the interior surface through a portion of the interior of the first diffuser ring to a plenum chamber. The one or more partial slot gaps may be located on a region of the interior of the first diffuser ring which is highly cambered.

The one or more additional diffuser rings may further comprise: an inlet and an outlet; and one or more slot gaps arranged within the body of at least one of the one or more additional diffuser rings, each slot gap creating a channel between the interior and exterior surfaces of each said diffuser ring, wherein at least one of the one or more additional diffuser rings is adapted to form a turbine rotor cowling that is integrally attachable to one of the one or more additional turbine rotors to form a unit that is rotatable about the horizontal axis of the wind turbine.

In an embodiment, a diffuser ring may incorporate a plenum chamber that is connected to one or more of the partial slot gaps and/or one or more partial thickness suction slots. The air may be actively pumped into or sucked out of the plenum chamber.

In an embodiment, the wind turbine may comprise one or more turbine blades to form a first turbine rotor that is integrally attached to the turbine rotor cowling formed by the first diffuser ring. The turbine blades may be constructed of material having a surface finish which induces turbulence in the boundary layer of the airflow. The one or more turbine blades may have at least one attached turbulator and/or at least one attached vortex generator. The one or more turbine rotor blades may have a partially scalloped structure. The turbine rotor may be located downstream of the principle vertical axis of the turbine.

In an embodiment the wind turbine may further comprise one or more additional turbine rotors each comprising one or more turbine rotor blades mounted co-axial to and downstream of the first turbine rotor.

The one or more additional turbine rotors may be counter-rotating turbine rotors.

The one or more turbine blades may be at least partially constructed from an aero-elastic material and arranged to provide a controlled deformation under wind load.

The wind turbine may further comprise: one or more additional diffuser rings comprising: an inlet and an outlet; and each of the one or more additional diffuser rings may be adapted to form a turbine rotor cowling that is integrally attachable to one of the one or more additional turbine rotors to form a unit that is rotatable about the horizontal axis of the wind turbine. The diffuser rings may be static diffuser rings. The diffuser rings may be separated from each other by a wholly circumferential slot gap between each pair of diffuser rings. The static diffuser ring may be located between two dynamic diffuser rings, each pair of diffuser rings being separated by a wholly circumferential slot gap.

One or more of the diffuser rings may have one or more slot gaps arranged within its body, each slot gap creating a channel between the interior and exterior surfaces of the first diffuser ring.

In an embodiment the wind turbine may be any of a land based turbine, a sea based turbine or an airborne turbine. The diffuser may be at least partially constructed from an aero-elastic material and arranged to provide a controlled deformation under wind load.

The wind turbine may be substantially as described herein with reference to, and as shown in, the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
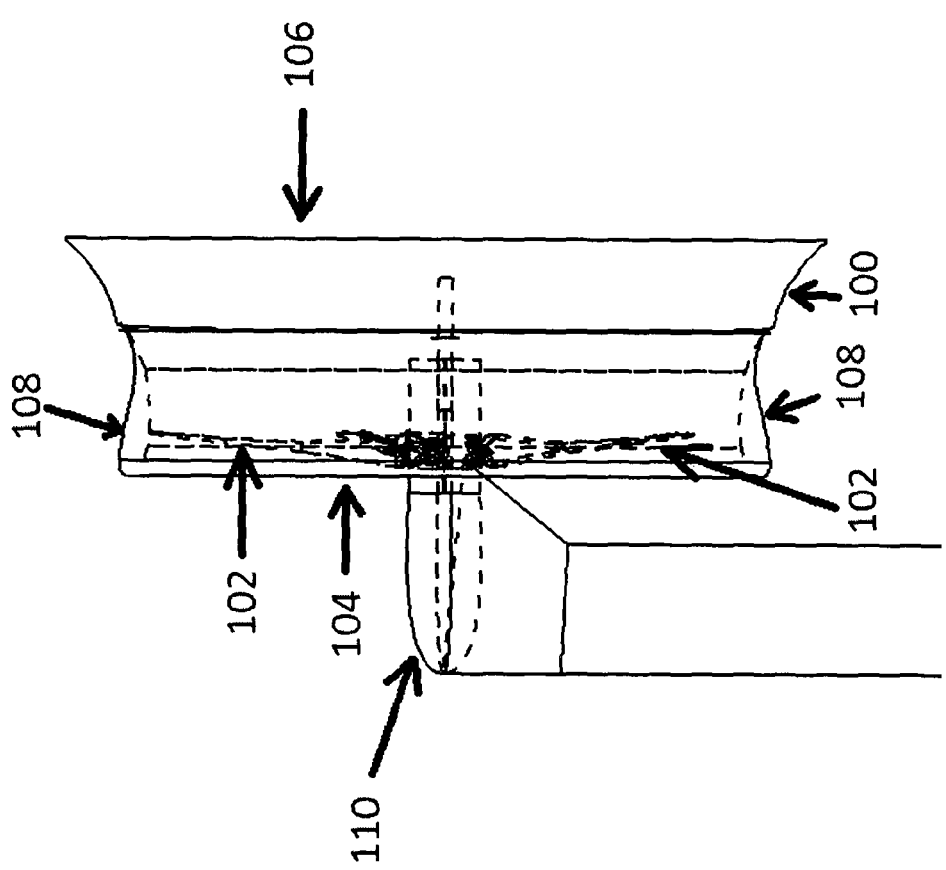
FIG. 1 is a side view of a diffuser which is fixed to and rotatable with one or more turbine blades.

Conventional large scale horizontal axis wind turbines are used in wind farms for commercial production of electric power. Smaller horizontal axis wind turbines may be located on private property e.g. the roofs of homes or offices for micro generation of electric power. They are typically comprised of a three-bladed turbine rotor connected to an electrical generator that is located in the turbine shaft.

When wind flows over the blades of a wind turbine rotor, lift is generated by the blades and causes the turbine rotor to turn, leading to the generation of electricity from the attached electrical generator (e.g. comprising a low speed drive shaft, a gearbox and a generator shaft). Therefore, as the turbine rotor turns, it rotates the low speed drive shaft attached to the gearbox, which in turn rotates the generator shaft at a speed required to generate electricity.

The lift created by a turbine rotor blade may be a function of its angle of attack and shape.

A yaw system is used to move the turbine rotor and ensure that it is pointed into the wind, in order to achieve the highest efficiency possible, according to Betz' law. The pointing may be carried out passively (e.g. using a wind vane) or actively (e.g. using computer-controlled yaw control system).

A diffuser may be fitted to a wind turbine in order to augment airflow into and around a horizontal axis wind turbine. The efficiency of the system may exceed theoretical Betz limits by hyper-accelerating air through a turbine rotor plane. This may be achieved by extracting the air through a compact diffusive system by decreasing the air pressure at the outlet, thereby causing air to be accelerated through the turbine. Therefore, decreasing the air pressure at the outlet will result in a corresponding increase in air velocity at the inlet, which leads to increased power output and efficiency.

A major practical issue for conventional diffuser-augmented wind turbines is that the large expansion in outlet area needed to accelerate air to a velocity that will give a large increase in efficiency has previously required a bulky and unwieldy cowling that creates a large aerodynamic load. The use of such a cowling may increase the amount of drag generated and increase the load on the wind turbine support tower. The production cost and space required for the turbine will also be significantly increased. The visibility profile of the diffuser may also be increased, which is undesirable as wind turbines are considered by many people to be unsightly.

When used herein, the term "diffuser ring" relates to any suitable configuration, such as an elliptical or, particularly, circular structure in cross section. Where two or more diffuser rings are described in combination, the rings are in fluid connection with each other and may be concentric or off-axis.

When used herein, the phrase "a turbine rotor cowling that is integrally attachable to a turbine rotor" relates to a situation where:

(1) the rotor cowling and turbine rotor are separate entities that may be attached together; or (2) the rotor cowling and turbine rotor are a unitary object (e.g. an object formed by moulding).

When used herein the term "dynamic diffuser ring" relates to a diffuser ring that can rotate about the horizontal axis of the wind turbine.

When used herein, the term "static diffuser ring" relates to a diffuser ring that cannot rotate about the horizontal axis of the wind turbine.

When used herein, the term "slot gap" relates to a slot through the structure of a diffuser ring arranged to create a channel between the interior and exterior surfaces of the diffuser ring. Unless otherwise stated, slot gaps may cover any portion of a diffuser ring's circumference, provided that they do not divide a ring into two separate parts. For example, a slot gap in a diffuser ring may be substantially circumferential (while retaining the structural integrity of the diffuser ring).

Generally, slot gaps may be downstream of the plane of a turbine rotor, which allows air to enter the diffuser. The air entering the diffuser re-energises the low energy post-rotor air, decreasing the pressure behind the turbine plane which, due to the Venturi effect, accelerates air through the turbine rotor. The air entering the diffuser can also re-energise the boundary layer area.

When used herein, the term "wholly circumferential slot gap" relates to a slot gap that acts as a spacer between two diffuser rings, such that a channel between the interior and exterior surfaces of the diffuser rings is created.

Wholly circumferential slot gaps may be upstream or downstream of the plane of a turbine rotor. For example, a diffuser system may comprise a static diffuser ring upstream of a dynamic diffuser ring formed with a rotor and a further static diffuser ring downstream of the dynamic diffuser ring, each ring separated by a wholly circumferential slot gap. Alternatively, in a dynamic-spin-dynamic diffuser system, the static diffuser ring is sandwiched between two dynamic rings and is separated from each by a wholly circumferential slot gap.

As described herein, a slot gap (or a wholly circumferential slot gap) creates a progressively decreasing overall duct cross-sectional area in the axial direction (i.e. the direction of air flow from interior to exterior), which enables the injection of higher speed air tangentially or substantially tangential to the internal or lower surface of a diffuser ring by channelling high pressure air (relative to the air pressure within or downstream from the diffuser) from the external or upper surface of the diffuser ring through the slot gap to the internal or lower surface of the diffuser ring. This re-energises the boundary layer and delays the onset of boundary layer growth and eventual separation from the diffuser wall.

When used herein the term "partial slot gap" refers to a slot gap that extends from the interior surface of a diffuser ring through a partial thickness of the diffuser structure only.

When used herein, aerodynamic force relates to the force generated when air flows over the turbine rotor blade. The term "lift" is used herein to refer to a component of the aerodynamic force which is perpendicular to the direction of the airflow. The term "drag" is used herein to refer to the component of the aerodynamic force which is parallel to the airflow.

The term "yaw" is used herein to refer to the movement of the wind turbine rotor around the vertical axis of the turbine.

The term "nacelle" is used herein to refer to the covering of the central shaft of the turbine which is rotatable about the horizontal axis and may house the generator and/or the gearbox.

The terms "upstream" and "downstream" are used herein to indicate direction relative to airflow.

The term "camber" is used herein to refer to aerodynamic camber e.g. a measure of the curvature of an aerofoil. Camber can be measured using, for example, a camber line, which is the curve that is halfway between the upper and lower surfaces of the aerofoil.

The term "aero-elastic material" is used herein to refer to a material that produces a controlled and predictable deformation under wind load. A non-exhaustive list of examples of aero-elastic materials that may be used are carbon fibre, fibre reinforced composites, metal matrix composites, epoxy based composites, thermoplastic composite, aluminium, fabric, piezoelectric materials or other appropriate aero-elastic materials and any combination thereof.

The term "stall" is used herein to refer to a reduction in the lift produced by the turbine rotor blade as the angle of attack increases (the angle of attack is an the angle between a reference line on a turbine rotor blade (e.g the chord line) and the vector representing the relative motion between the turbine rotor blade and the air moving through the turbine rotor plane). Beyond a critical angle of attack less lift than drag is created.

The term "pitch" is used herein to refer to turning the angle of attack of the turbine rotor blades into or out of the wind to control the production or absorption of power.

The term "substantially radially" is used herein to refer to a diffuser or wind turbine component which extends outwards from a central point of the diffuser. However, the component of the diffuser is not required to be linear in profile.

Although the present examples are described and illustrated herein as being implemented in a diffuser augmented wind turbine, the systems described are provided as an example and not a limitation. As those skilled in the art will appreciate, the present examples are suitable for application in a variety of different types of ducted rotors.

When air flows over the surface of a diffuser augmented wind turbine a boundary layer of air is generated. The boundary layer is an area of transition between near stationary air close to the surface of the diffuser and air at some distance away which is moving at the free stream velocity. The maximum thickness of the boundary layer is normally defined by the distance from the turbine rotor blade at which the air flow velocity is 99% of the free-stream velocity. Depending on the profile of the turbine rotor blade, the air will often flow smoothly in a thin boundary layer across much of the surface.

A boundary layer will tend to separate from the surface of the diffuser augmented wind turbine in a process of flow separation. Flow separation occurs when the speed of the boundary layer relative to the turbine rotor blade falls almost to zero. The fluid flow of air becomes detached from the surface of the blade, and instead takes the forms of eddies and vortices. Such flow separation causes bubbles of stagnant air to form beneath the separated layer, creating additional drag. A large increase in drag causes a decrease in efficiency and may cause the rotor to stall. Bubbles of stagnant air can be reduced or even eliminated by shaping the one or more turbine rotor blades to move the separation point downstream.

The exact nature of the boundary layer is dependent on many factors including the turbine rotor blade construction and the airflow and airspeed. However boundary layers may be either laminar (layered) or turbulent (disordered). As well as the development of airfoil stall, the details of the flow within the boundary layer are very important for many problems in aerodynamics, including the skin friction drag of an object and the heat transfer that occurs in high-speed flows. Although the skilled person will be familiar with the concepts of boundary layer physics, more details may be found in e.g. Landau & Lifshitz, 1987, Fluid Mechanics, $2^{nd}$ edn, Chapter 4, Butterworth-Heinemann.

The diffuser comprises a diffuser ring that is arranged to form a cowling surrounding a turbine rotor, the turbine rotor comprising one or more turbine blades. The turbine cowling is fixed to and rotatable with the turbine rotor, such that the interior surface of the turbine cowling is attached to the one or more turbine blades (e.g. to the tips of the turbine blades).

When used herein "attached" may mean connected to or integral with the rotor blade, e.g. the cowling and the rotor may be formed of a single moulding. The diffuser ring may include one or more vortex entrainment devices arranged on the trailing edge of the diffuser ring. The vortex entrainment devices create micro-structure vortices downstream of the turbine blades, which reduce the pressure behind the turbine rotor plane. Reduction in pressure behind the turbine rotor plane increases suction through the turbine blades, hence increasing efficiency The one or more vortex entrainment devices may act as additional blade tips, such that when positioned in an airflow the vortex entrainment devices act to provide additional torque for rotating the rotor and attached cowling.

The diffuser ring may further include one or more slot gaps. The one or more slot gaps allow high energy air from the exterior of the diffuser to enter the diffuser behind the turbine plane, thereby re-energising the low energy post-rotation air. Without wishing to be bound by theory, the rotatable diffuser ring in combination with the one or more slot gaps may facilitate the generation of one or more vortices behind the turbine plane. This vorticity causes a drop in pressure, which causes air to be accelerated through the plane of the turbine rotor due to the Venturi effect. The re-energisation of air behind the turbine plane may also help to prevent flow separation and reduce the parasitic drag associated with the diffuser.

The diffuser configuration may also reduce the drag associated with the structure. The diffuser configuration may be any suitable configuration such as, but not limited to, a cylindrical, ovoid or a conical configuration (e.g. a conical configuration).

The diffuser may be at least partially constructed of an aero-elastic material. In an example the diffuser may be comprised of one or more aero-elastic flaps. The deformation of the diffuser may enable airflow stall to be prevented (for low wind speeds) or enabled (for high wind speeds), according to the prevailing wind-speed. In low wind-speed conditions (e.g. less than 20 m/s) preventing air-flow stall may comprise tuning the diffuser to decrease angle of attack. For example; the diffuser may be tuned so that airflow is directed to the tips of the wind turbine's rotor blades. Passive aero-elastic tuning of the diffuser to different aerodynamic configurations dependent on the wind-speed may allow the wind turbine to continue to produce electricity even at low wind-speeds. In high wind speed conditions (e.g. greater than 20 m/s) inducing airflow stall may comprise, for example, tuning the diffuser so that the angle of attack is increased. Inducing airflow stall may be used to reduce airflow through the diffuser and/or reduce drag to protect the structure at high wind-speeds. Aero-elastic tuning ay also be used to reduce the amount of drag produced by the turbine diffuser.

Using aero-elastic materials to construct parts of the diffuser, rather than using systems that mechanically adjust the diffuser and/or the turbine rotor blades reduces the complexity of the wind turbine and provides increased reliability and ease of construction. For example, adjustments to wind turbine rotor blades to alter the pitch have typically been carried out using a mechanical bearing and/or a slewing drive. The slewing drive may be a hydraulic or electrical system. Breaking systems may also be used in order to adjust the turbine rotor speed or stop the rotor in dangerous wind conditions or for maintenance. These systems increase the complexity of the wind turbine and may not alter the pitch of the blade quickly enough in gusty wind conditions. Complex slewing and breaking systems are also prone to failure, which in the event that a turbine exceeds its engineered limits in high wind conditions may result in the generator overheating and/or irreparable damage to the wind turbine. The turbine blade and cowling arrangement may be cast a single piece or a small number of pieces reducing construction costs and improving structural integrity e.g. using aero-elastic materials. For example the diffuser may include an aero-elastic hinge system where a portion of the diffuser is intentionally weakened or trimmed to deform under wind pressure and provide a without the disadvantages of a mechanical system connecting two components.

In a further embodiment, the turbine rotor blades may optionally also be at least partially constructed from an aero-elastic material and arranged to provide controlled deformation under wind load. Constructing the turbine rotor blades from aero-elastic materials allows the blades to be passively tuned according to the instantaneous wind conditions and may reduce or eliminate the need for complex mechanical systems for adjusting blade pitch and rotor speed.

The turbine rotor blades described herein may be located at the rear of the central shaft nacelle and downstream of the principle vertical axis of the turbine, wherein the principle vertical axis is the axis about which the turbine yaws. In an example, the rotor may be located on the downstream (lee) side of the support tower when the turbine is in use. In an example a turbine rotor downstream of the vertical yaw axis of the turbine may enable the turbine rotor to act as a passive yaw system, or part of a passive yaw system as described above. In an example the turbine may freely point into the wind without the aid of a mechanical pointing system and may negate the need for other passive yaw tracking systems.

Augmenting a wind turbine with a diffuser as described herein may have a number of advantages in addition to more efficient conversion of wind energy to electrical energy when compared to a classical wind turbine of equal rotor diameter. As described above, peak output may be manipulated with wind speed and rotor torque via the control of radial velocity distribution. Additional features may be incorporated into the diffuser in order to reduce wake turbulence, which allows turbines to be mounted closer to other turbines. This may provide financial benefits for onshore and particularly for offshore installations. A number of features which may be used to facilitate a reduction in wake turbulence are described herein. Furthermore, by controlling or eliminating blade tip vortices an enclosed rotor blade may reduce the amount of noise pollution produced. In some embodiments, the diffuser systems described herein may also be retrofitted into suitable existing turbine installations.

The diffuser may be connected to a turbine rotor comprising one or more turbine blades as described above. In some embodiments the diffuser and the turbine rotor may be constructed as a single structure, in others the diffuser may be retrofitted to turbine rotor blades e.g. to existing turbine installations. The turbine rotor blade may incorporate one or more of the features of:

(a) being constructed of material of a given surface finish which induces turbulence in the boundary layer of the airflow;

(b) having a partially scalloped structure;

(c) attaching a turbulator; and/or (d) attaching a vortex generator.

These features may trip the boundary layer into turbulence, preventing stagnation. A turbulent boundary layer contains more energy, so will delay separation until a greater magnitude of negative pressure gradient is reached, effectively moving the separation point further downstream and possibly eliminating separation completely.

A turbulator may be a mechanical turbulator (for example a zig-zag strip that is attached to the turbine rotor blade) or a pneumatic turbulator (for example small holes in the turbine rotor blade surface to blow air into the boundary layer).

A vortex generator may be a small vane or bump attached to the turbine rotor blade or interior surface of the diffuser. The vortex generator creates a vortex which draws energetic, rapidly-moving air from outside the slow-moving boundary layer into contact with the turbine rotor blade, re-energizing the boundary layer.

In an example a vortex generator is rectangular or triangular in cross-section. A vortex generator may have a thickness equivalent to a partial thickness of the boundary layer. For example the vortex generator may be 50-90% as thick as the boundary layer. The vortex generator may be positioned in such a way that it has an angle of attack with respect to the local airflow.

It will be understood that that the diffuser augmented wind turbines described herein are not limited to land based turbines. The diffuser augmented turbines may be located in water such as offshore wind turbines e.g. floating turbines. The diffuser augmented turbines may also be airborne turbines e.g. tethered turbines. For example the diffuser may additionally incorporate lifting components such as bladders, which may be filled with a lighter than air substance e.g. helium in order to elevate the turbine.

FIG. 1 illustrates a diffuser 100 which is fixed to and rotatable with the one or more turbine rotor blades 102 (as discussed herein, the diffuser 100 may optionally be formed as part of the turbine rotor). Air flows into the diffuser through the inlet 104 and out of the diffuser through the outlet 106. The diffuser may be formed of a first diffuser ring comprising an inlet and an outlet. In the embodiment of FIG. 1 the diffuser 100 forms a turbine rotor cowling, the turbine rotor cowling being integrally attachable to the turbine rotor for a unit that is rotatable about the horizontal axis of the wind turbine. The turbine rotor comprises one or more turbine rotor blades such as 1-10 turbine rotor blades, e.g. 1 to 4 turbine rotor blades, such as 3 turbine rotor blades. The one or more turbine rotor blades are arranged so that they are in connection with the interior surface of the turbine rotor cowling 100, such that the turbine rotor cowling rotates in combination with the turbine rotor blades (e.g. the turbine rotor cowling is connected to the tips of the turbine rotor blades). The wind turbine rotor blades may be adjusted according to wind conditions in order to increase or decrease angle of attack. The diffuser may also comprise a central shaft 110 which may be fixed or rotatable. The rotation of the diffuser cowling trailing edge with specific vortex entrainment geometries creates vortices downstream of the diffuser exit. This reduces exit pressure and increases velocity through the rotor plane.

The diffuser may optionally additionally comprise one or more slots gaps 108, as described above, that facilitate the mixing of air from the exterior of the diffuser with air from the interior of the diffuser, re-energising the air within the diffuser, contributing to the pressure reduction and reducing flow separation. The one or more slot gaps extend through the whole thickness of the first diffuser ring. The diffuser may have, for example, a flared configuration as shown in FIG. 1. The expansion of the diffuser volume behind the turbine plane contributes to a reduction in pressure behind the turbine plane. The generation of the vortex behind the turbine plane by the rotation of the diffuser may also help to facilitate airflow mixing and reduce flow separation.

Additional slot gaps may be present on the first or other diffuser rings, optionally these additional slot gaps are partial slot gaps (i.e. the slot gap has an outlet on the interior surface of the diffuser only and extends only part-way through the structure of the diffuser ring). Such partial thickness slot gaps may be connected to a plenum chamber. Air may be pumped from the plenum chamber and pass through the slot gap on the internal surface of the ring and into the airflow passing through the diffuser. The fast moving pumped air may suck the slow moving boundary layer air behind it and cause the slow air to accelerate. This may increase airflow through the diffuser. The air may be pumped by an active pumping system (e.g. a compressor with an external power supply), a hydraulic system or an alternative mechanical system. The plenum chamber may have an inlet on the exterior surface of the diffuser ring in order to enable pumping air into the plenum chamber from the exterior of the diffuser.

The slot gaps described herein may have a progressively decreasing overall duct cross-sectional area in the axial direction, which enables the injection of higher speed air tangentially or substantially tangential to the internal or lower surface of a diffuser ring by channelling high pressure air (relative to the air pressure within or downstream from the diffuser) from the external or upper surface of the diffuser ring through the slot gap to the internal or lower surface of the diffuser ring. This re-energises the boundary layer and delays the onset of boundary layer growth and eventual separation from the duct of diffuser wall.

In an aspect of the invention there may be one or more plenum chambers within the diffuser ring, each comprising a portion of the circumference of the ring. In another aspect of the invention there may be one plenum chamber which may extend through a large portion of the circumference of the ring. In an aspect of the invention, where one plenum chamber comprises a large portion of the circumference of the ring, the plenum chamber may additionally comprise one or more dividers or partitions arranged to provide structural support to the ring. When one or more plenum chambers are incorporated, the pumping system may optionally be switched on and off as required. In other embodiments the system may be a passive system without active pumping.

Figure 2:
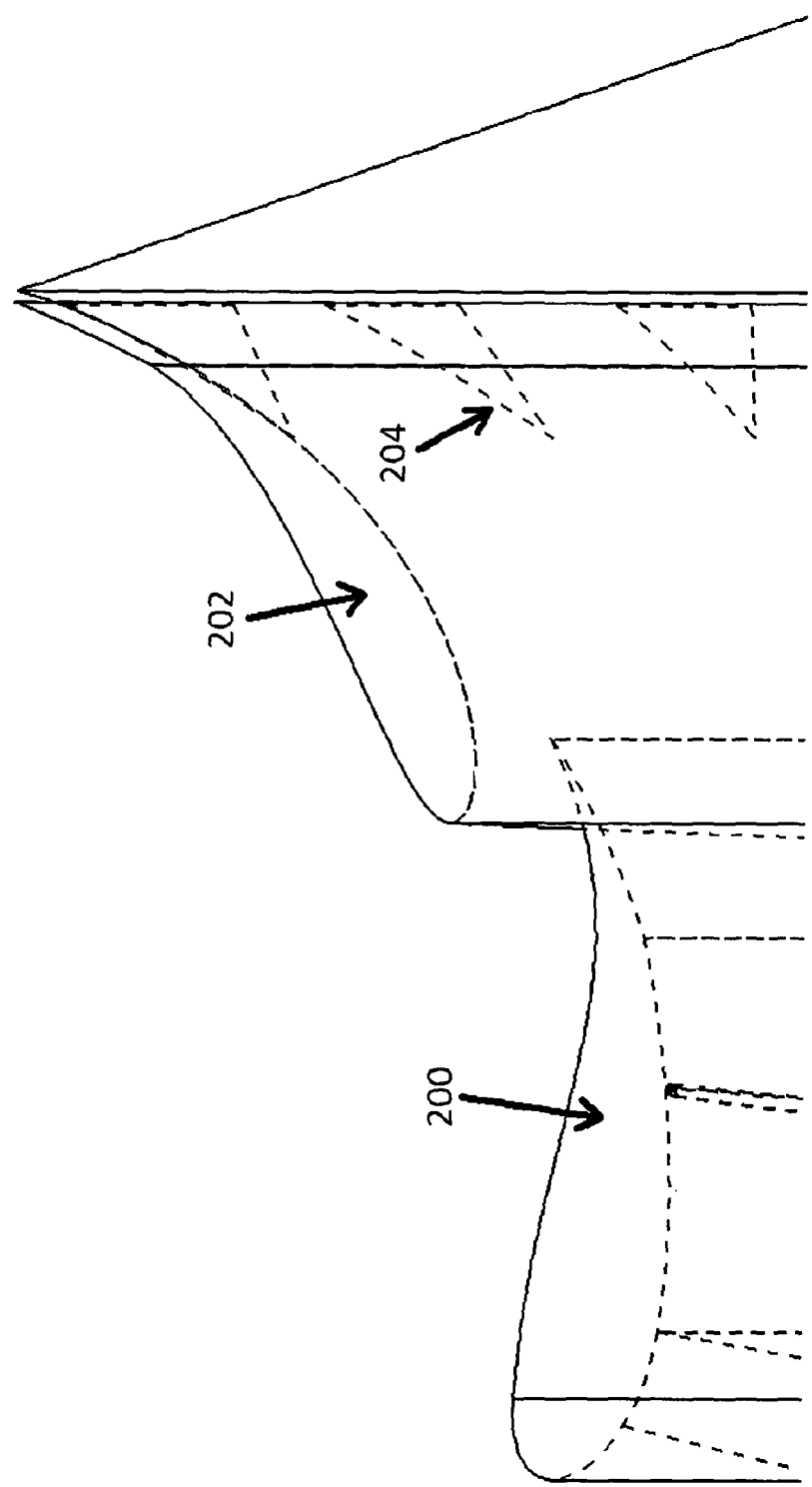
FIG. 2 is an example close-up illustration of the slot gaps in the diffuser of FIG. 1.

FIG. 2 is an example close-up illustration of example slot gaps. In an embodiment, the diffuser ring may comprise one or more slot gaps 200, 202, each slot gap creating a channel between the interior and exterior surfaces of the diffuser rings. Air passing through a slot gap may have a total pressure close to the free-stream value e.g. the pressure of the undisturbed airflow. The one or more slot gaps enable high energy airflow to re-energise low energy airflow within the diffuser by allowing high energy airflow from the outside of the diffuser to enter the diffuser through the diffuser wall. This prevents flow separation and enables enhanced diffusion. The one or more slot gaps may be located on a region on the interior of any diffuser ring that is highly cambered. Locating the slot gap on a region of the interior of a diffuser that has a high camber may facilitate the mixing of the high energy air entering through the slot gap with the low energy air passing through the diffuser. A plurality of vortex generators 204 are also shown in FIG. 2 attached to the trailing edge of the diffuser ring.

Figure 3:
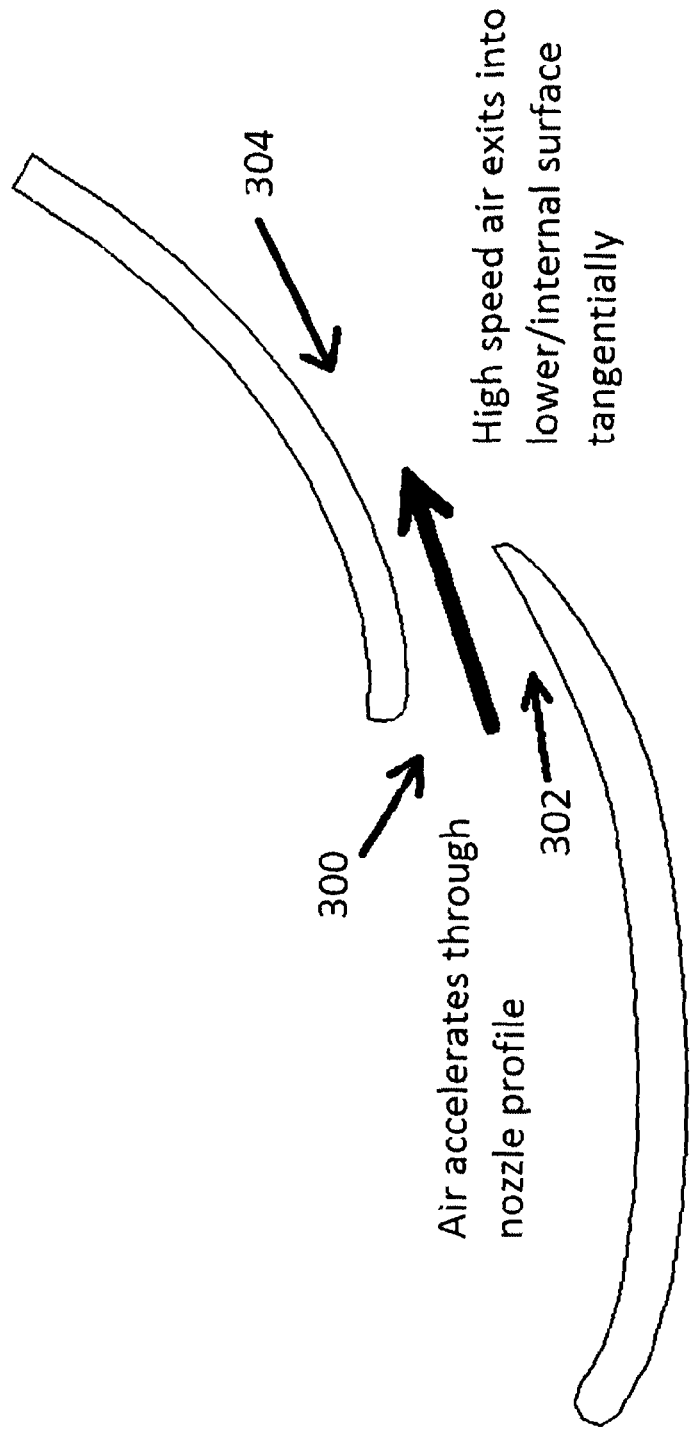
FIG. 3 is another example illustration of a slot gap configuration.

FIG. 3 is another example embodiment of slot gaps. Air from the exterior of the diffuser enters through an inlet 300 on the exterior surface of the diffuser ring. The slot gap 302 has a progressively decreasing overall duct cross-sectional area in the axial direction which accelerates the air. The high speed air exits into the interior of the diffuser ring through the outlet of the slot gap 304. The air may exit the slot gap tangentially to the interior surface of the diffuser.

Figure 4:
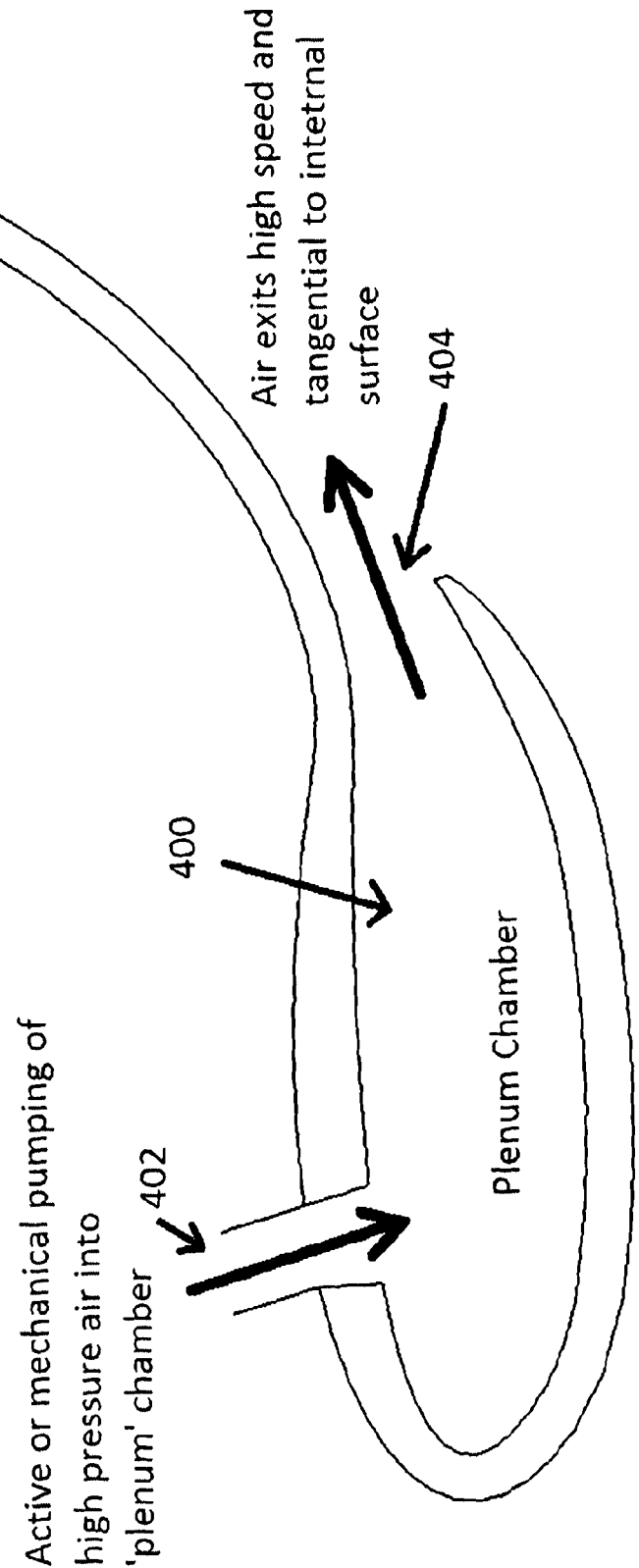
FIG. 4 is an example illustration of a slot gap connected to a plenum chamber.

FIG. 4 is an example embodiment of a partial slot gap incorporating a plenum chamber. Air from the exterior of the diffuser enters the plenum chamber 400 through an inlet 402 on the exterior surface. The air may be actively pumped into the plenum chamber 402 via the inlet 400 or the system may be passive. Air exits the plenum chamber 402 through an outlet 404 e.g. a partial slot gap. The outlet 404 may be tangential to the interior surface of the diffuser. The injection of air tangentially or substantially tangentially re-energises the boundary layer and delays the onset of boundary layer growth and eventual separation from the duct of diffuser wall.

According to another aspect of the invention a horizontal axis wind turbine diffuser may comprise, a first diffuser ring comprising, an inlet and an outlet; and one or more vortex entrainment devices attached to a trailing edge of the diffuser; wherein the first diffuser ring is adapted to form a turbine rotor cowling that is integrally attachable to a turbine rotor to form a unit that is rotatable about the horizontal axis of the wind turbine. The one or more vortex entrainment devices may form a vortex entrainment system. The one or more vortex entrainment devices may be dynamic, aeroelastic vortex entrainment devices.

In an embodiment, as described above, one or more vortex entrainment devices is fixed to the trailing edge of the diffuser ring. A vortex entrainment device is a device which has a geometry that imparts a discrete local rotation the flow. A vortex entrainment device may be any device which enables vortex generation e.g. fins, saw-tooth, cusps. However, it will be appreciated that the example geometries described herein are by way of example only and other geometries may be used. The vortex entrainment device may perform a re-energising function as described above by mixing the high energy airflow passing over the diffuser with the low energy airflow exiting the diffuser. For example the vortex entrainment device may generate a plurality of microvortices downstream of the diffuser. This results in a reduction of induced drag For example, the tip of the vortex entrainment device may have a higher degree of sweep than the rest of the diffuser which decreases the induced drag experienced by the diffuser. Additionally or alternatively, the vortex entrainment devices may be angled upwards increasing the local dihedral near the wing tip in order to generate micro-structure vortices, further reducing the pressure behind the turbine plane and reduce lift-induced drag.

The vortex entrainment devices may be rigid in form. In other embodiments the vortex entrainment device may be aero-elastic so that they deform dynamically under different wind loads in order to optimize the reduction in induced drag and vortex entrainment at various wind loads.

Figure 5:
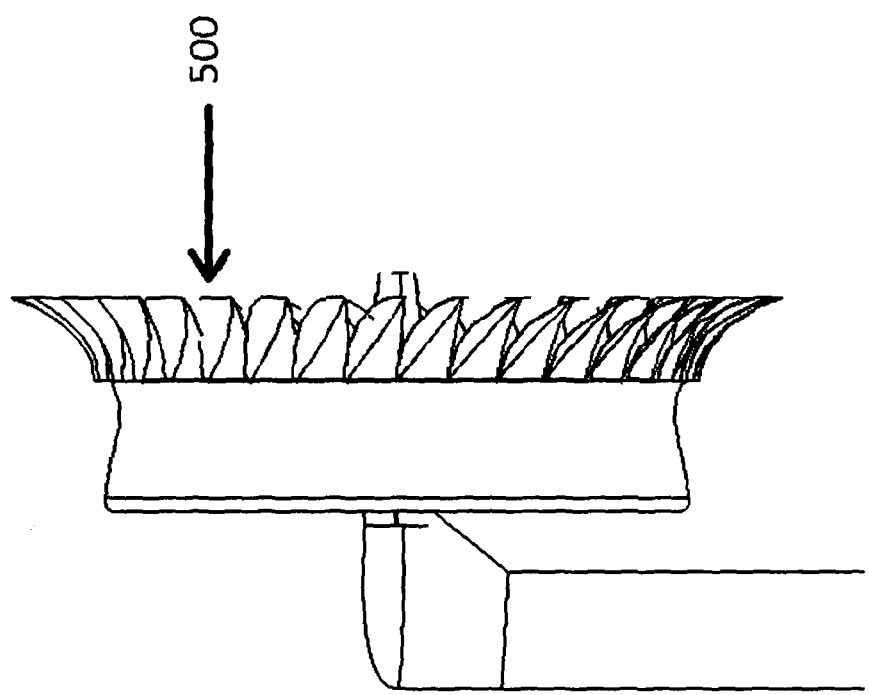
FIG. 5 is an example illustration of a diffuser ring including a vortex entrainment system.

FIG. 5 is an example illustration of a diffuser ring including a vortex entrainment system. In an embodiment the vortex entrainment system 500 may comprise one or more vortex entrainment devices which may be dynamic, aero-elastic,vortex entrainment devices. In an embodiment, the vortex entrainment system may create a plurality of micro-structure vortices which wrap around themselves and thereby inducing a lower pressure downstream from the turbine rotor plane than may be found with simple geometries. The reduction in pressure behind the turbine rotor plane increases suction through the turbine blades, hence increasing efficiency. The vortex entrainment devices may be attached to the trailing edge of the first diffuser ring as shown in FIG. 5, however it will be appreciated that it may be attached to any or all of the trailing edges of the diffuser.

One or more of the modified turbine rotor blades 102, slot gaps 302, 400 vortex generators 204 or a vortex entrainment system 500 may be used alone or in combination with any of the diffusers of the invention disclosed herein in order to reduce induced drag on the diffuser and improve efficiency of the wind turbine system. Additionally, the use of one or more of these features in a diffuser augmented wind turbine may help to reduce downstream wake turbulence, Wake turbulence is caused by the formation of a wake vortex behind the turbine rotor plane. Reducing the wake turbulence allows the turbines to be sited more closely together than un-augmented turbines or diffuser augmented turbines without any of these features. The ability to site the turbines closer together improves efficiency and reduces the environmental impact and cost of typical wind farm. For example, the increased efficiency may allow the same amount of power to be produced on a smaller area of land than would be required for a conventional wind turbine farm (reducing land costs and reducing visual impact on the landscape) or allowing a greater amount of power to be produced on the same amount of land (increasing power output)

In another aspect provided herein, the diffuser has at least one diffuser ring which is rotatable about the horizontal axis of the wind turbine and at least one further diffuser ring. In an embodiment the at least one further diffuser ring may be static (e.g. non-rotatable about the horizontal axis).

In a further embodiment there are one or more further diffuser rings that may each be separated by a wholly circumferential slot gap (e.g. the one or more further diffuser rings may be dynamic or, particularly, static). The wholly circumferential slot gap allows high energy air to enter the diffuser.

In some embodiments, the inlet area of each of the one or more further diffuser rings is less than the outlet area of the diffuser ring immediately upstream from it and the outlet area is greater than or equal to its inlet area. In an embodiment with more than one diffuser ring the total outlet area of the diffuser may be greater than its cross-sectional area.

The diffuser rings may be constructed so that each diffuser ring, in a downstream direction, has a lower aero-dynamic camber than the preceding ring. In an embodiment, each of the diffuser rings has a lower camber than the previous diffuser rings in a downstream direction. Without wishing to be bound by theory, it is believed that this results in the creation of geometrically increasing diffuser ducts, leading to a progressively lower exit pressure.

Figure 6:
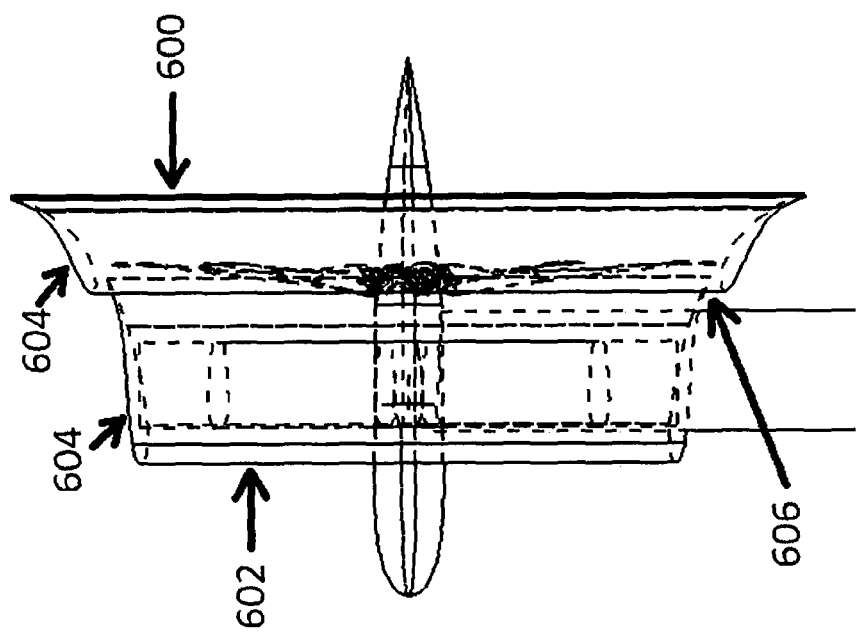
FIG. 6 is an example illustration of a suction slot configuration.

A diffuser augmented wind-turbine with at least one static ring and one dynamic ring as described above may comprise one or more generators, the one or more generators comprising at least one generator stator and at least one generator rotor, one of the stator or rotor being fixed to or incorporated within a static diffuser ring and the other of the generator stator or generator rotor being fixed to or incorporated within the dynamic ring. A generator incorporated into the diffuser and turbine rotor blades may augment or replace a generator in the central support shaft In an embodiment as described with reference to FIG. 6 the rotatable diffuser ring 600 is located downstream of a static diffuser ring 602. The rotatable 600 and the static 602 diffuser rings may incorporate any of the features described above. For example both may incorporate one or more vortex entrainment devices (not shown). Both the static and rotatable diffuser rings may incorporate slot gaps 604 as described above. A wholly circumferential slot gap 606 may be located between the diffuser rings. The static diffuser ring 602 may also include one or more guide vanes. In the embodiment described with reference to FIG. 6, the guide vanes are pre-rotation guide vanes. For example, the pre-rotation vanes reduce twist in the airflow entering the diffuser, thereby increasing the efficiency of the air through the turbine plane. In a further example, the guide vanes may be aerofoil shaped, however, this is not essential and any appropriate shape may be used. The guide vanes may be arranged to provide additional structural support to the diffuser. The additional structural support may facilitate aero-elastic deformation of the diffuser, for example due to different wind loads. The rotatable diffuser ring may optionally have an outlet area which is greater than the inlet area in order to reduce the pressure behind the turbine plane.

In an embodiment, a plurality of static diffuser rings may be located downstream from the first rotatable diffuser ring. The static diffuser rings may comprise an inlet and an outlet, where the inlet area of each downstream static diffuser ring is less than the outlet area of the immediately upstream static diffuser ring and the outlet area of each respective static diffuser ring is greater than or equal to the inlet area of that diffuser ring (e.g. the cross-sectional profile of each of the diffuser rings may be conical or cylindrical (e.g. conical)). For example, the outlet area of each diffuser ring may be greater than its inlet area.

Diffuser configurations with a plurality of static diffuser rings as described in the current application may have a large expansion of the outlet area without a significant increase in cross-sectional area. This allows air to be accelerated through the turbine, giving an increase in efficiency while overcoming the issues related to a large increase in size of the turbine. The expansion in outlet area may be in the range of 1.2-10 times the area of the inlet area, such as 2:1 to 5:1 (e.g. 2.5:1 to 4.5:1) times the inlet area.

The ratio of the total diffuser outlet area to the first diffuser ring inlet area is greater than the ratio of the largest diffuser cross-sectional area to the first diffuser ring inlet area. Examples of an appropriate ratio of total diffuser ring outlet area to the first diffuser ring inlet area may be 2:1, 2.5:1, 3.2:1, 4:1, 4.5:1, 3.2:1 (e.g. 2.1:1, 3.2:1, such as 3.2:1)

In an embodiment one or more of the diffuser rings may additionally incorporate one or more suction slots. A suction slot may have a progressively increasing overall duct cross-sectional area in the axial direction (i.e. the direction of airflow) such as a compressive nozzle geometry, the boundary layer is not re-energised tangentially by a suction slot, but is sucked-off in a substantially perpendicular manner. Suction slots may also be optionally linked to an exterior venting structure. A suction slot may be a partial thickness suction slot (i.e. extending through only a portion of the diffuser ring). A partial thickness suction slot may connect to a plenum chamber.

Figure 7:
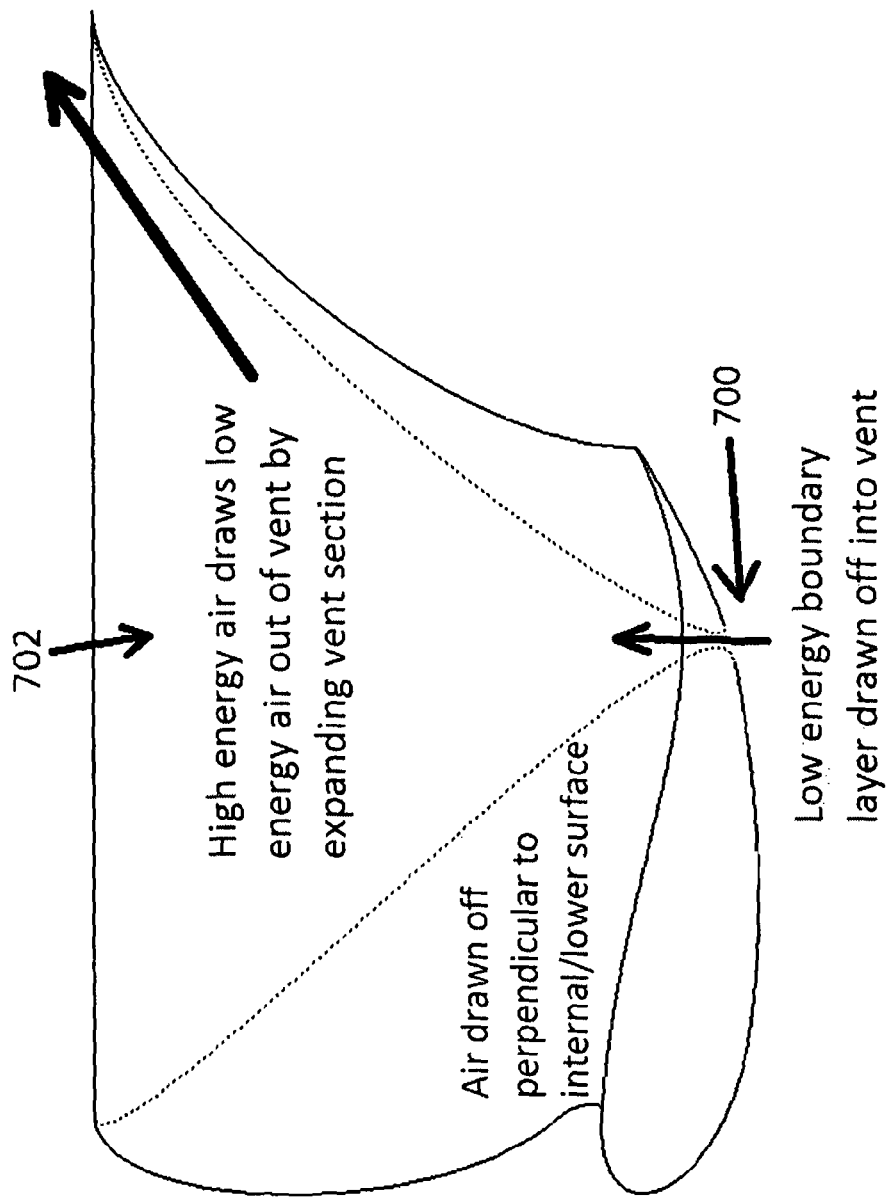
FIG. 7 is an example illustration of a suction slot connected to a plenum chamber.

FIG. 7 is an example illustration of a suction slot. In an embodiment, low energy boundary layer air is drawn out of the diffuser through suction slot inlet 700. The air may be drawn off perpendicular to the internal surfaces of the diffuser. The expansion of the suction slot 702 decreases the pressure of the air exiting the suction slot and facilitates the suction of low energy boundary layer air out of the diffuser via the Venturi effect. The high energy air moving over the exterior surface of the diffuser facilitates the drawing off of the boundary layer by mixing with and energising the low energy air.

Figure 8:
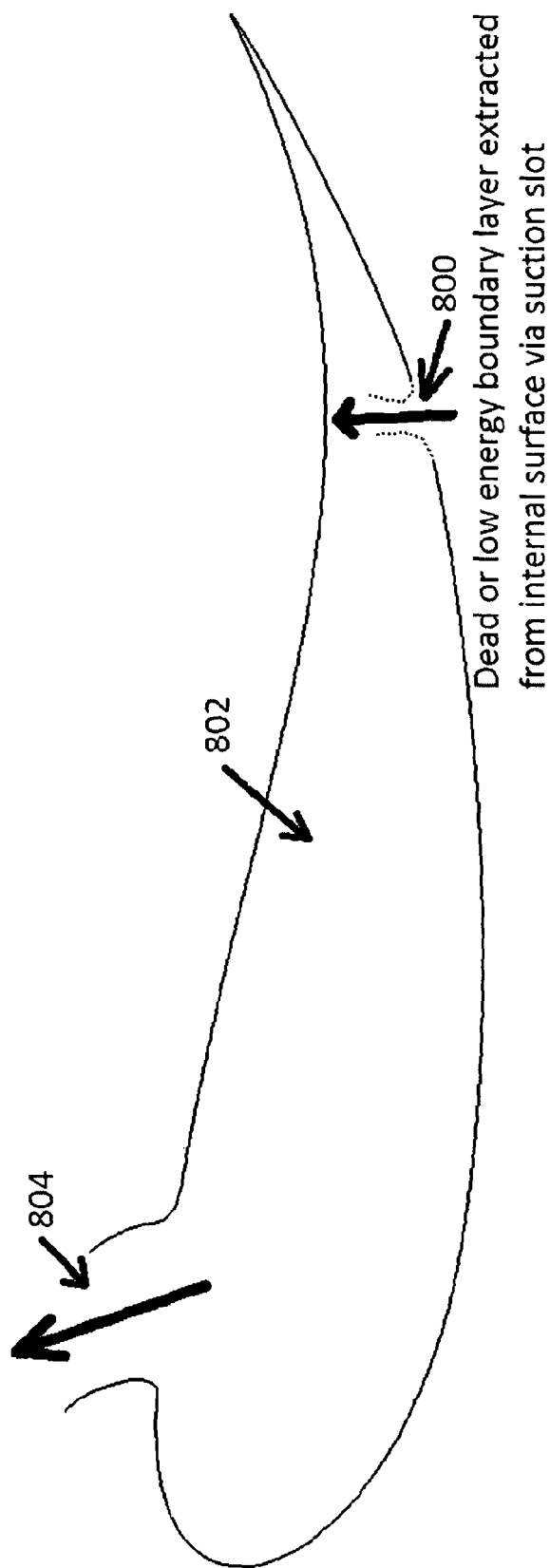
FIG. 8 illustrates a diffuser embodiment with a static diffuser ring located upstream of a rotatable diffuser ring.

FIG. 8 is an example illustration of a partial suction slot connected to a plenum chamber. In an embodiment, low energy boundary layer air is drawn out of the diffuser through suction slot inlet 800. The air may be drawn off perpendicular to the internal surfaces of the diffuser. The pressure in the plenum chamber 802 may be reduced mechanically to evacuate the plenum chamber which will draw air into the suction slot. The air may exit the plenum chamber though an outlet slot 804 which may be connected to a vent structure.

Vent structures may be directly connected to suction slots, or optionally connected to a suction slot via a plenum chamber such as the plenum chambers described above in connection to slot gaps. In another embodiment of the invention, air may be actively or passively sucked from the plenum chamber and pass through one or more of the suction slots on the exterior surface of the ring in order to assist in reducing the pressure behind the turbine plane. Vent structures may bring the exit of the diffuser into the higher energy air passing over the diffuser. This interaction with high energy airflow prevents stagnation of the air exiting the diffuser. The vent structures also increase the outlet area of the device without increasing its cross-section. Furthermore, vent structures may be used to increase structural integrity by connecting the diffuser ring to a flap structure. The vent structures may be asymmetric in design in order to facilitate increased torque on the ring as it spins.

Vent structures attached to the diffuser may help to capture slightly yawed wind conditions on the exterior of the diffuser, this may produce a higher pressure exterior to the diffuser and lead to more efficient suction. In an example the vent structures stop the high-pressure air on the exterior of the diffuser from rolling over the diffuser into the low-pressure air beneath, causing induced drag. The vent structures may also aid in yaw alignment of the turbine and may negate the need for alternative passive wind yaw tracking systems. Many modern wind turbines have active yaw tracking systems and the use of vent structures may assist in active wind tracking.

The vent structures may be used in combination with an active pumping system in order to increase the extraction of air from the diffuser. In another embodiment the vent structures may be used to provide air to a high energy blowing slot gap, as opposed to the passive, or actively pumped slot gaps described above The vent structures themselves may be shaped as the tips of the rotor extending presented as an aerofoil at angle of attack, radially, creating additional deliverable torque from the assembly by themselves.

In embodiments where the static diffuser ring is located downstream from the rotatable diffuser ring, the static diffuser rings may additionally incorporate one or more vent structures.

Figure 9:
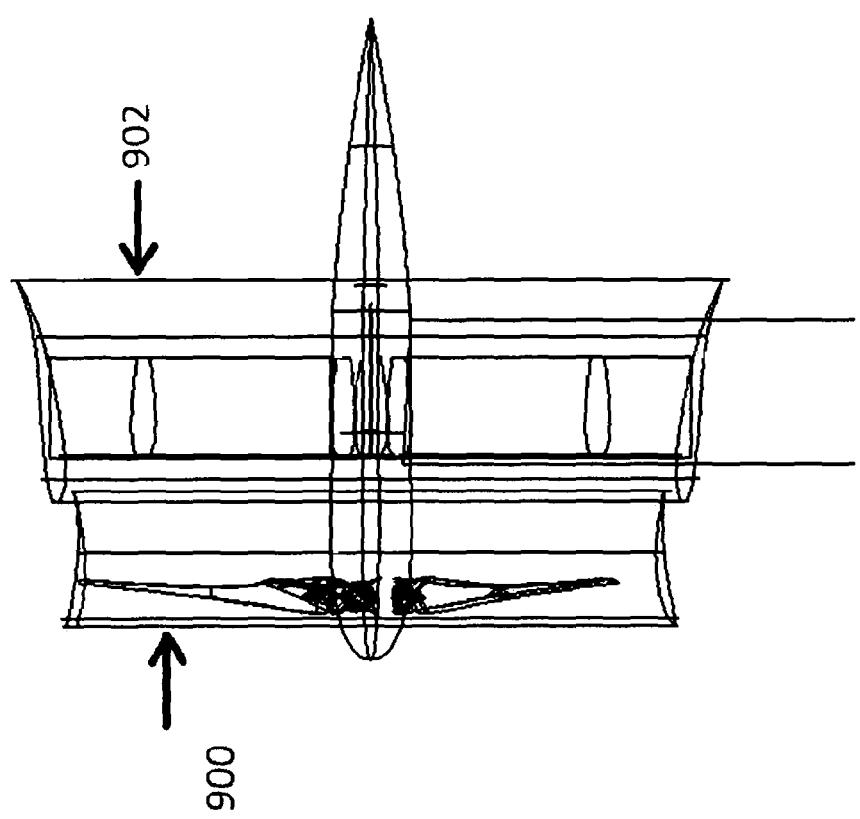
FIG. 9 illustrates an embodiment if the diffuser with a static diffuser ring located downstream of a rotatable diffuser ring.

FIG. 9 illustrates an embodiment of the diffuser wherein the rotatable diffuser ring 900 is upstream of a static diffuser ring 902. The static diffuser ring 902 of the diffuser configuration shown in FIG. 9 may optionally include one or more post rotation guide vanes (not shown) located behind the turbine plane. A diffuser configuration as shown in FIG. 9 may optionally include any or all of the features described above (not shown) such as, one or more vortex entrainment devices, slot gaps within the diffuser rings, wholly circumferential slot gaps between the diffuser rings, additional static diffuser rings, suction vents in order to provide an increased outlet area and therefore an increased reduction in pressure behind the turbine plane. In embodiments of the diffuser, the diffuser rings may be separated from each other by a wholly circumferential slot gap which re-energises the air as it passes through the diffuser.

In a further embodiment, where there is one or more turbine rotors, the turbine rotors may be counter-rotating rotors, which may power the same generator or different generators (e.g. the same generator). Two or more counter rotating turbine rotors may eliminate the need for complex gearing and yawing mechanisms. Counter-rotating turbine rotors may be used to increase the rotation speed of the electrical generator. In an example, the one or more turbine rotor blades in each turbine rotor may be slightly angled forwards so as to avoid hitting the rear ones. In another example the one or more turbines or more turbines may be of different diameters.

In an embodiment, each of the one or more turbine rotors is fixed to and rotatable with a diffuser ring which forms a turbine cowling around the rotor. These diffuser rings are adapted to form turbine rotor cowlings that are integrally attachable to a turbine rotor to form a unit that is rotatable about the horizontal axis of the wind turbine. In some multiple rotor embodiments, the whole diffuser may be rotatable. In another embodiment, the dynamic diffuser rings may be separated by at least one static component of the diffuser between each dynamic diffuser ring (e.g. a static diffuser ring). For example, where there are two rotors that are counter rotating rotors, the two dynamic diffuser rings may be separated by at least one static component, e.g. a static diffuser ring. Each diffuser ring in the diffuser may be separated by a wholly circumferential slot gap. The one or more additional diffuser rings comprises an inlet and an outlet; and optionally one or more slot gaps which extend from the interior surface of the diffuser ring and extend through the whole thickness of the first diffuser ring.

Figure 10:
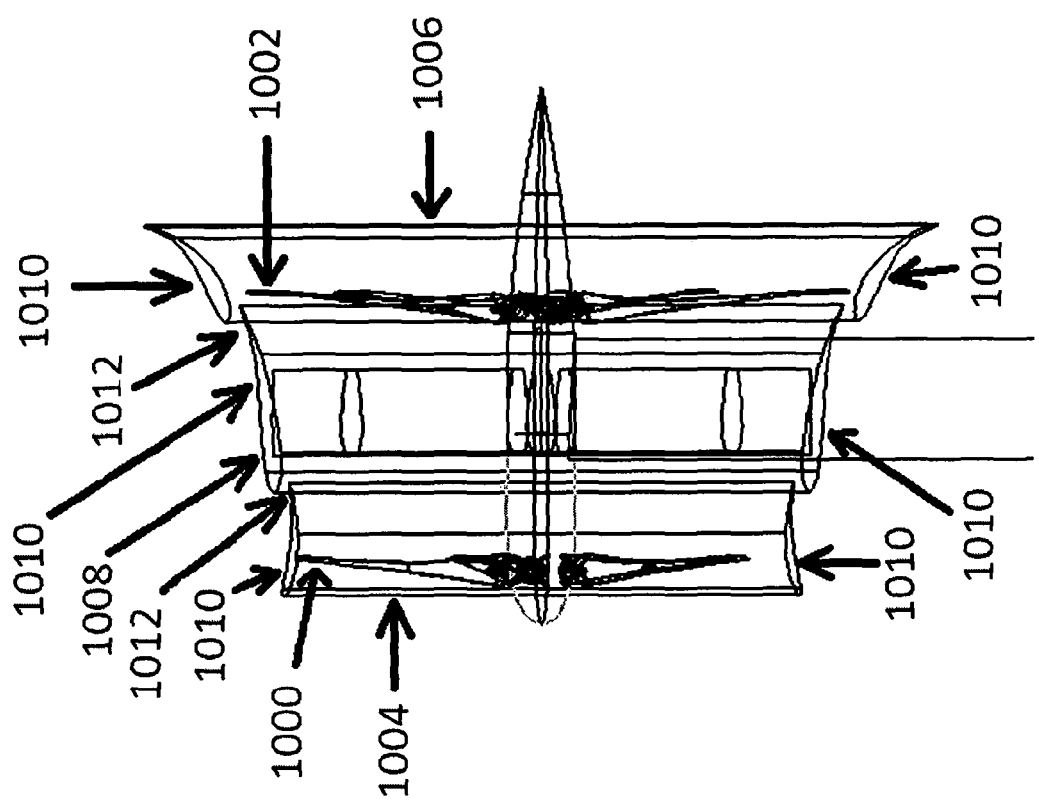
FIG. 10 is an example illustration of a wind turbine configuration with multiple wind turbine rotors.

FIG. 10 is a side view of a diffuser augmented wind turbine with substantially co-axial rotors where a first turbine rotor 1000, comprising one or more turbine blades, and a second turbine rotor 1002, comprising one or more turbine blades, may be connected to the same central driveshaft (not shown). of the one or more turbine rotors 1000, 1002 is fixed to and rotatable with diffuser rings 1004, 1006, respectively. which form turbine cowlings around the rotors. The rotatable diffuser rings are separated by a static diffuser ring 1008. Each of the diffuser rings may optionally have one or more slot gaps 1010. Wholly circumferential slot gaps 1012 separate the diffuser rings.

The diffuser embodiments described herein with reference to FIG. 1-10 refer to example configurations and are not intended to be limiting. As will be appreciated, any appropriate combination of rotatable diffusers may be used e.g. rotatable-rotatable, static-rotatable-static, rotatable-static-rotatable-static or others.

As will be appreciated, the diffuser configurations as described herein, relating to an aspect using a fully rotatable diffuser and an aspect relating to a partially rotatable diffuser may also incorporate any or all of the other features described above with reference to FIGS. 1-6, whether alone or in combination.

Any range or device value given herein may be extended or altered without losing the effect sought as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought. The method blocks or elements identified do not comprise an exclusive list and a method or apparatus may contain additional blocks or elements.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

It will be understood that the benefits and advantages described above may relate to one embodiment or may relate to several embodiments. The embodiments are not limited to those that solve any or all of the stated problems or those that have any or all of the stated benefits and advantages.

The invention claimed is:

1. A horizontal axis wind turbine augmented with a diffuser, the diffuser comprising:
   a first diffuser ring comprising;
   an inlet and an outlet; and
   one or more vortex entrainment devices attached to a trailing edge of the first diffuser ring;
   wherein the first diffuser ring is adapted to form a turbine rotor cowling that is integrally attachable to a turbine rotor to form a unit that is rotatable about a horizontal axis of the wind turbine; and
   wherein the one or more vortex entrainment devices are dynamic, aero-elastic vortex entrainment devices.

2. A wind turbine according to claim 1 further comprising one or more slot gaps arranged within a body of the first diffuser ring, each slot gap creating a channel between interior and exterior surfaces of the first diffuser ring.

3. A wind turbine according to claim 2, wherein the one or more slot gaps have a progressively decreasing overall duct cross-sectional area in an axial direction, arranged so that air is accelerated from the exterior surface of the diffuser into the interior.

4. A wind turbine according to claim 2 further comprising one or more additional slot gaps which extend from the interior surface through at least a partial thickness of the first diffuser ring.

5. A wind turbine according to claim 4 wherein the one or more additional slot gaps is located on a region of the interior of the first diffuser ring which is cambered.

6. A wind turbine according to claim 2 wherein the diffuser ring incorporates a plenum chamber that is connected to one or more of the slot gaps and/or one or more suction slots.

7. A wind turbine according to claim 6 wherein air is actively pumped into or sucked out of the plenum chamber.

8. The wind turbine according to claim 1, wherein the diffuser further comprises one or more additional static and/or dynamic diffuser rings, each of the one or more additional static and/or dynamic diffuser rings having an inlet and an outlet that is substantially co-axial to the first diffuser ring.

9. A wind turbine according to claim 8 wherein a ratio of the total diffuser outlet area to the first diffuser ring inlet area is greater than a ratio of a largest diffuser cross-sectional area to the first diffuser ring inlet area.

10. A wind turbine according to claim 8 further comprising radially oriented guide vanes connected to at least one static diffuser ring.

11. A wind turbine according to claim 10, wherein the guide vanes are arranged to reduce twist in airflow passing through the diffuser and are comprised of at least one of: pre-rotation vanes, located upstream of a turbine plane and/or post-rotation vanes, located downstream of the turbine plane.

12. A wind turbine according to claim 8 wherein, in a downstream direction from a primary diffuser ring, each of the one or more further additional static and/or dynamic diffuser rings has a lower camber than an immediately previous diffuser ring.

13. The wind turbine according to claim 1, wherein the diffuser comprises the first diffuser ring and one or more static diffuser rings downstream of the first diffuser ring.

14. The wind turbine according to claim 1, wherein the diffuser comprises the first diffuser ring and one or more static diffuser rings upstream of the first diffuser ring.

15. A wind turbine according to claim 1, further comprising one or more vent structures and one or more suction slots, where the one or more vent structures are located on an exterior surface of the first diffuser ring and the or each vent structure is connected to one or more suction slots, the suction slots extending through an entire thickness of the first diffuser ring.

16. A wind turbine according to claim 15, wherein the vent structures are only located on the exterior surface of static diffuser rings.

17. A wind turbine according to claim 1 further comprising a central shaft.

18. A wind turbine according to claim 1, wherein the diffuser further incorporates a vortex generator.

19. A wind turbine according to claim 1, further comprising one or more turbine blades that forms a first turbine rotor that is integrally attached to the turbine rotor cowling formed by the first diffuser ring.

20. A wind turbine according to claim 19, wherein the turbine blades are constructed of material having a surface finish which induces turbulence in a boundary layer of airflow.

21. A wind turbine according to claim 19, wherein the one or more turbine blades have at least one attached turbulator and/or at least one attached vortex generator.

22. A wind turbine according to claim 19 wherein the one or more turbine blades has a partially scalloped structure.

23. A wind turbine according to claim 19 wherein the first turbine rotor is located downstream of a principle vertical axis of the turbine.

24. A wind turbine according to claim 19, further comprising one or more additional turbine rotors each comprising one or more turbine rotor blades mounted co-axial to and downstream of the first turbine rotor.

25. A wind turbine according to claim 24, further comprising:
   one or more additional diffuser rings comprising:
   an inlet and an outlet; and
   wherein each of the one or more additional diffuser rings is adapted to form turbine rotor cowlings that are integrally attachable to one of the one or more additional turbine rotors to form a unit that is rotatable about the horizontal axis of the wind turbine.

26. A wind turbine according to claim 24 wherein the one or more additional turbine rotors are counter-rotating turbine rotors.

27. A wind turbine according to claim 24 further comprising one or more static diffuser rings.

28. A wind turbine according to claim 24 wherein the diffuser rings are separated from each other by a wholly circumferential slot gap between each pair of diffuser rings.

29. A wind turbine according to claim 24 wherein a static diffuser ring is located between two dynamic diffuser rings, each pair of diffuser rings being separated by a wholly circumferential slot gap.

30. A wind turbine according to claim 24 wherein one or more of the diffuser rings has one or more slot gaps arranged within its body, each slot gap creating a channel between the interior and exterior surfaces of the first diffuser ring.

31. A wind turbine according to claim 1 where the diffuser is at least partially constructed from an aero-elastic material and is arranged to provide a controlled deformation under wind load.

32. A wind turbine according to claim 1 which is any of a land based turbine, a sea based turbine or an airborne turbine.

33. A horizontal axis wind turbine augmented with a diffuser, the diffuser comprising:
   a first diffuser ring comprising:
   an inlet and an outlet; and
   one or more slot gaps arranged within its body, each slot gap creating a channel between interior and exterior surfaces of the first diffuser ring;
   wherein the first diffuser ring is adapted to form a turbine rotor cowling that is integrally attachable to a turbine rotor to form a unit that is rotatable about a horizontal axis of the wind turbine; and
   wherein the diffuser is at least partially constructed from an aero-elastic material and is arranged to provide a controlled deformation under wind load.

34. A wind turbine according to claim 33, wherein one or more vortex entrainment devices is attached to a trailing edge of the diffuser.

35. A horizontal axis wind turbine augmented with a diffuser, the diffuser comprising:
   a first diffuser ring the first diffuser ring being adapted to form a turbine rotor cowling that is integrally attachable to a turbine rotor to form a unit that is rotatable about a horizontal axis of the wind turbine; and
   one or more static diffuser rings;
   wherein the diffuser rings are separated from each other by a wholly circumferential slot gap between each pair of diffuser rings; and
   wherein the diffuser is at least partially constructed from an aero-elastic material and is arranged to provide a controlled deformation under wind load.

* * * * *